United States Patent
Jang et al.

(10) Patent No.: US 11,019,661 B2
(45) Date of Patent: May 25, 2021

(54) METHOD AND WIRELESS TRANSMITTER FOR PREVENTING DATA COLLISION INVOLVING HIDDEN CHANNEL PROBLEM

(71) Applicant: SEOUL NATIONAL UNIVERSITY R&DB FOUNDATION, Seoul (KR)

(72) Inventors: Seo Woo Jang, Seongnam-si (KR); Sae Woong Bahk, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 105 days.

(21) Appl. No.: 16/349,654

(22) PCT Filed: Dec. 9, 2016

(86) PCT No.: PCT/KR2016/014489
§ 371 (c)(1),
(2) Date: May 14, 2019

(87) PCT Pub. No.: WO2018/043834
PCT Pub. Date: Mar. 8, 2018

(65) Prior Publication Data
US 2019/0281629 A1 Sep. 12, 2019

(30) Foreign Application Priority Data
Aug. 31, 2016 (KR) .................. 10-2016-0111975

(51) Int. Cl.
*H04L 5/00* (2006.01)
*H04W 28/04* (2009.01)
(Continued)

(52) U.S. Cl.
CPC ....... *H04W 74/0816* (2013.01); *H04L 5/0055* (2013.01); *H04W 24/02* (2013.01);
(Continued)

(58) Field of Classification Search
None
See application file for complete search history.

(56) References Cited

U.S. PATENT DOCUMENTS

2010/0091789 A1* 4/2010 Choi ................ H04W 72/0446
370/445
2014/0064101 A1* 3/2014 Hart .................... H04L 27/0006
370/241
(Continued)

FOREIGN PATENT DOCUMENTS

JP         2002-247051 A    8/2002
KR   10-1995-0001355 B1    2/1995
(Continued)

OTHER PUBLICATIONS

Jang Seo Woo, "Channel Allocation and post-CCA based Bandwidth Adaptation in Wireless Local Area Networks with Heterogeneous Bandwidths", Ph.D. Dissertation of Seoul National University Dept. of Computer Science and Engineering, Aug. 2015, pp. 1-106.
(Continued)

*Primary Examiner* — Joseph A Bednash
(74) *Attorney, Agent, or Firm* — LRK Patent Law Firm

(57) ABSTRACT

The present invention relates to a data collision prevention method that is capable of solving a so-called hidden channel problem that may arise when there are two wireless senders with different communication ranges. More particularly, the present invention relates to a data collision prevention method and a wireless sender enabling such prevention, wherein a data collision may occur when two wireless senders simultaneously transmit data to a receiver in a situation where only one wireless sender can detect a data transmission state of the other wireless sender.

9 Claims, 5 Drawing Sheets

(51) Int. Cl.
  *H04W 74/00* (2009.01)
  *H04W 24/02* (2009.01)
  *H04W 74/08* (2009.01)
(52) U.S. Cl.
  CPC ......... *H04W 28/04* (2013.01); *H04W 74/002* (2013.01); *H04W 74/08* (2013.01)

(56) References Cited

U.S. PATENT DOCUMENTS

2015/0103713 A1* 4/2015 Lee .................. H04W 74/0816
                                                                  370/311
2015/0181537 A1* 6/2015 Ogura .................. H04W 52/24
                                                                  455/522
2019/0306920 A1* 10/2019 Son .................... H04W 74/004

FOREIGN PATENT DOCUMENTS

| KR | 10-0747758 B1 | 8/2007 |
| KR | 10-1172219 B1 | 8/2012 |
| KR | 10-1491555 B1 | 2/2015 |
| KR | 10-2016-0042001 A | 4/2016 |

OTHER PUBLICATIONS

Search Report, dated May 18, 2017, for International Application No. PCT/KR2016/014489.
Written Opinion, dated May 18, 2017, for International Application No. PCT/KR2016/014489.

* cited by examiner

METHOD AND WIRELESS TRANSMITTER FOR PREVENTING DATA COLLISION INVOLVING HIDDEN CHANNEL PROBLEM

CROSS-REFERENCE TO RELATED APPLICATIONS

The present application is a U.S. National Phase entry from International Application No. PCT/KR2016/014489, filed Dec. 9, 2016, which claims priority to Korean Patent Application No. 10-2016-0111975, filed Aug. 31, 2016, the disclosures of which are incorporated by reference herein in their entirety.

BACKGROUND

1. Technical Field

The present invention relates to a data collision prevention method that is capable of solving a so-called hidden channel problem that may arise when there are two wireless senders with different communication ranges. More particularly, the present invention relates to a data collision prevention method and a wireless sender enabling such prevention, wherein a data collision may occur when two wireless senders simultaneously transmit data to a receiver in a situation where only one wireless sender can detect a data transmission state of the other wireless sender.

2. Description of Related Art

Many studies on communication technologies have been continuously made, and also, it is expected that demands for building more rapid and stable networks will be not reduced even in the future. On the other hand, interests in wireless communication have been more increased in the 2000s, and especially, technologies on rapid and stable data transmission and reception through portable devices have been suggested more actively.

Wireless network environments, that is, devices for wirelessly transmitting data and devices for wirelessly receiving data are densely constructed, so that a stability problem in data transmission becomes emerged. In detail, as wireless senders or wireless relays capable of transmitting or relaying data are built in every place, users can easily use wireless data communication at anytime and anywhere, but as one receiver forms a transmission channel together with the wireless senders or wireless relays to receive the data, a data collision problem and a data transmission failure problem on the transmission channel may frequently occur.

Like this, a data collision occurring on the transmission channel results in the unnecessary consumption of communication resources to cause a quality of communication to be deteriorated, and therefore, the data collision problem should be solved before a future society wherein wireless network will be more densely built.

The present invention is invented on the basis of the above-mentioned technological background so as to satisfy the technological demands as mentioned above and to provide additional components easily not inventible by persons skilled in the relevant art.

Prior Art Document—(Patent Document 1) Korean Patent Registration No. 10-0747758 (issued on Aug. 2, 2007)

SUMMARY

Accordingly, the present invention has been made in view of the above-mentioned problems occurring in the prior art, and it is an object of the present invention to provide a data collision prevention method that is capable of preventing a data collision, which is called a hidden channel problem, from occurring, in a wireless network environment where two or more wireless senders can transmit data to one receiver, at the time when one wireless sender cannot detect a transmission state of the other wireless sender.

In detail, the object of the present invention is to provide the data collision prevention method that is capable of checking environmental conditions where the hidden channel problem occurs to improve the environmental conditions, and in this case, first, one wireless sender of the wireless senders for transmitting data to the receiver, which is capable of detecting the transmission state of the other wireless sender, detects the transmission state of the other wireless sender and a state of a transmission channel currently occupied by the other wireless sender and prevents the data collision from occurring, so that the wireless senders do not simultaneously transmit the data to one receiver on the same transmission channel as each other.

To accomplish the above-mentioned objects, according to one aspect of the present invention, there is provided a data collision prevention method in a wireless environment wherein under the existence of a first wireless sender and a second wireless sender close to each other, the first wireless sender detects a transmission channel state of the second wireless sender, whereas the second wireless sender cannot detect a transmission channel state of the first wireless sender, including the steps of: (a) transmitting data to a receiver from the first wireless sender; (b) checking (Post-CCA) whether a transmission channel to the receiver is in idle state through the first wireless sender; and (c) determining whether the data is transmitted to the receiver through the first wireless sender according to the checking result in the step (b).

According to the present invention, desirably, in the step (b), an energy level of the transmission channel is detected to check whether the transmission channel is in the idle state.

According to the present invention, desirably, in the step (b), the first wireless sender captures a data packet transmitted and received through the transmission channel to check whether the transmission channel is in the idle state.

According to the present invention, desirably, the data collision prevention method further, after the step (b), includes the step of (b-1) checking whether acknowledgement (ACK) is received through the first wireless sender.

According to the present invention, desirably, if it is checked that the transmission channel is not in the idle state in the step (b) and if it is checked that the acknowledgement (ACK) is not received in the step (b-1), the first wireless sender in the step (c) recognizes that a hidden channel problem occurs on the channel to the receiver and stops the data transmission.

According to the present invention, desirably, if it is checked that the transmission channel is not in the idle state in the step (b) and if it is checked that the acknowledgement (ACK) is not received in the step (b-1), the first wireless sender in the step (c) recognizes that a hidden channel problem occurs on the channel to the receiver and performs a reducing, extending, or exploring operation to change the transmission channel to the receiver.

According to the present invention, desirably, the data collision prevention method further, before the step (a), includes the step of checking (Pre-CCA) whether the transmission channel to the receiver is in the idle state through the first wireless sender.

To accomplish the above-mentioned objects, according to the other aspect of the present invention, there is provided a wireless sender for preventing a data collision in a wireless environment wherein under the existence of the corresponding wireless sender close to the other wireless sender, the corresponding wireless sender can detect a transmission channel state of the other wireless sender, and the other wireless sender cannot detect a transmission channel state of the corresponding wireless sender, including: a transmission part for forming a transmission channel to a receiver to transmit data to the receiver; a channel state detecting part for detecting the transmission channel state to the receiver; and a controller for controlling the transmission part and the channel state detecting part.

According to the present invention, desirably, the channel state detecting part checks (Post-CCA) whether the transmission channel is in idle state after the data is transmitted to the receiver through the transmission part.

According to the present invention, desirably, the channel state detecting part checks whether acknowledgement (ACK) is received after checking whether the transmission channel is in the idle state.

According to the present invention, desirably, if it is checked that the transmission channel is not in the idle state and if it is checked that the acknowledgement (ACK) is not received, the controller recognizes that a hidden channel problem occurs on the channel to the receiver and stops the data transmission.

According to the present invention, desirably, the wireless sender further includes a transmission channel setting part for changing the transmission channel, and if it is checked that the transmission channel is not in the idle state and if it is checked that the acknowledgement (ACK) is not received, the controller recognizes that a hidden channel problem occurs on the channel to the receiver and allows the transmission channel setting part to perform a reducing, extending, or exploring operation to change the transmission channel to the receiver.

Advantageous Effects

According to the present invention, the hidden channel problem occurring between the wireless senders with different transmission state detecting ranges from each other can be prevented, and in more detail, the data collision induced by the hidden channel problem can be prevented.

According to the present invention, in addition, the data collision can be prevented, thereby allowing a network environment with excellent stability to be built.

According to the present invention, moreover, the consumption of resources, that is, channels, required for communication can be minimized.

DETAILED DESCRIPTION OF THE INVENTION

Figure 1:
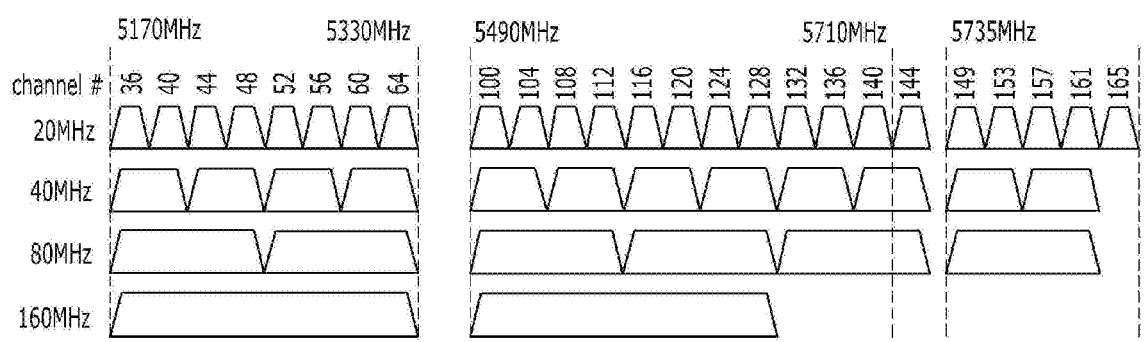
FIG. 1 shows transmission channels used by a wireless sender at the time when the wireless sender transmits data to a receiver.

Objects, configurations and operating effects of the present invention will be more clearly understood from the detailed description as will be described below and the attached drawings. The present invention will now be described in detail with reference to the attached drawings.

Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims.

Functional blocks as shown in the drawings and as will be described later are just examples that can be carried out. In other examples, other functional blocks may be used with the scope and range of the present invention. Further, one or more functional blocks in the present invention are indicated as individual blocks, but one or more functional blocks in the present invention may be combinations of various hardware and software components.

In the description, when it is said that one portion is described as "includes" any component, one element further may include other components unless no specific description is suggested, and it should be understood that it does not preclude additional components.

When it is said that one element is described as being "connected" or "coupled" to the other element, one element may be directly connected or coupled to the other element, but it should be understood that another element may be present between the two elements.

Terms, such as the first and the second may be used to describe various elements, but the elements should not be restricted by the terms.

In contrast, when it is said that one element is described as being "directly connected" or "directly coupled" to the other element, it should be understood that another element is not present between the two elements. In the description, when it is said that one portion is described as "includes" any component, one element further may include other components unless no specific description is suggested.

Hereinafter, a hidden channel problem and a method according to the present invention suggested to solve the hidden channel problem will be explained with reference to the attached drawings.

Figure 2A:
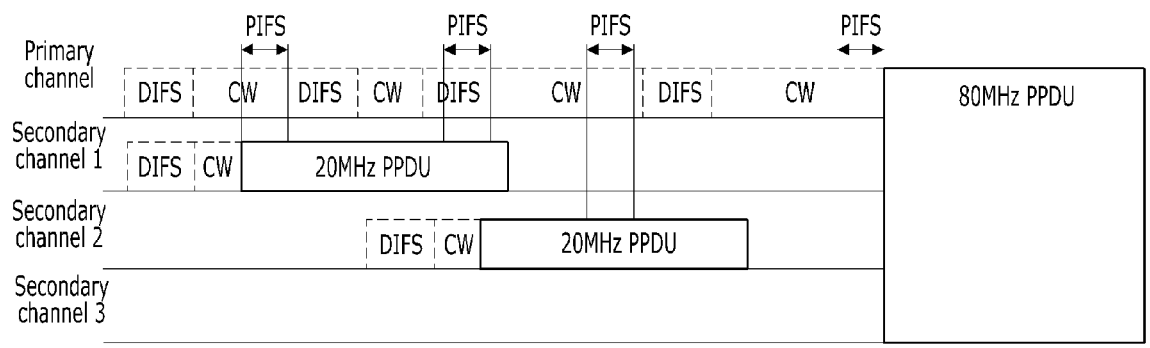
FIGS. 2A and 2B show mechanisms occupying channels at the time when a wireless sender transmits data to a receiver.
Figure 2B:
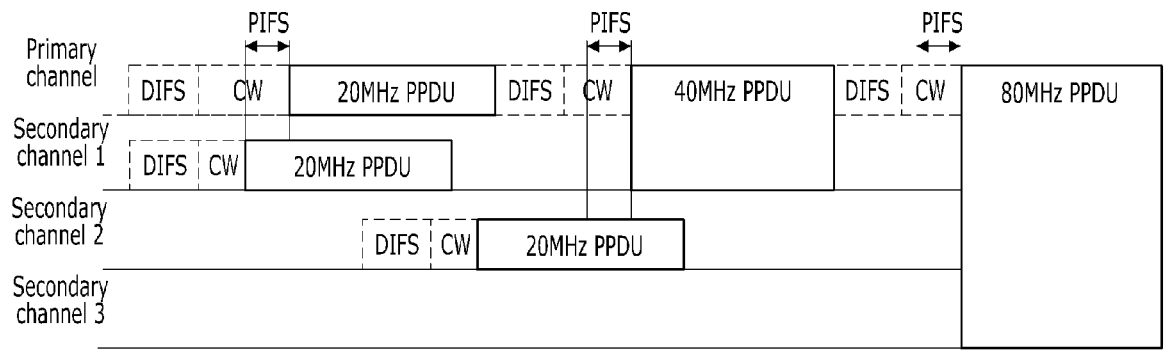

Before the hidden channel problem is explained, on the other hand, channels utilized by a wireless sender at the time when the wireless sender transmits data and channel occupying mechanisms of the wireless sender will be disclosed with reference to FIGS. 1 to 2B.

FIG. 1 shows transmission channels used by the wireless sender at the time when the wireless sender transmits data. It should be understood that the present invention is applicable to a general wireless network environment, but desirably, the present invention is based on IEEE 802.11ac, while utilizing the channels as shown in FIG. 1.

A channel means a signal path from a source of data to a place at which the data is received, and the channel exists in a wireless communication network formed between the wireless sender and a receiver.

According to the present invention, the receiver means all kinds of terminals capable of receiving data through the wireless network, and for example, the receiver includes a smartphone, a portable computer, a desktop computer, a tablet PC, and so on. According to the present invention, further, it should be understood that the wireless sender includes terminals for transmitting or relaying data to the receiver, and at this time, the wireless sender includes a mobile communication network relay, a wireless router, and so on.

On the other hand, as shown in FIG. 1, one primary channel and a plurality of secondary channels are provided as transmission channels. The respective channels are formed to have predetermined frequencies assigned thereto. For example, a 20 MHz channel is formed as the primary channel, and 40, 80, and 160 MHz channels are as the secondary channels. Moreover, one wireless sender can transmit data to the receiver through one or more channels, that is, through the primary channel or the primary channel and the secondary channels close to the primary channel. For example, as shown in FIG. 1, the wireless sender can transmit data to the receiver only through the primary channel, through the primary channel and one secondary channel (that is, the 40 MHz channel), or through the primary channel and the two secondary channels (that is, the 40 and 80 MHz channels). On the other hand, the frequency bandwidth assigned to one channel may be varied according to embodiments of the present invention.

Further, the transmission channels selected and formed by the wireless sender are varied according to whether the transmission channels are occupied by another wireless sender, which will be explained with reference to FIGS. 2A and 2B.

FIGS. 2A and 2B show processes wherein after a specific wireless sender detects a state of a transmission channel at the time when it transmits data to a receiver, the wireless sender waits for the time when the transmission channel is in idle state and thus occupies the transmission channel being in the idle state.

FIG. 2A shows a static access transmission method. As shown in FIG. 2A, a specific wireless sender waits for the time when the transmission channel is in idle state, while time corresponding to a plurality of DIFS (DCF Inter-Frame Spacing) and CW is being repeated. At this time, the DIFS and CW are unit time when the wireless sender waits for the time when the transmission channel is in the idle state.

Referring in detail to FIG. 2A, at the time when the wireless sender transmits data to the receiver through the 80 MHz transmission channel, it waits for the moments when all of the primary channel, the first secondary channel, and the second secondary channel are in the idle state. In more detail, the wireless sender checks whether the first secondary channel and the second secondary channel are in the idle state during the unit time of the plurality of DIFS and CW, and after it is checked that the channels are in the idle state, the wireless sender transmits data to the receiver through the primary channel, the first secondary channel and the second secondary channel.

On the other hand, FIG. 2B shows a dynamic access transmission method. As shown in FIG. 2B, basic operations in the dynamic access transmission method are the same as in FIG. 2A in that the specific wireless sender waits for the time when the transmission channel is in idle state, while time corresponding to the plurality of DIFS (DCF Inter-Frame Spacing) and CW is being repeated, but in the dynamic access transmission method, the wireless sender starts to transmit data to the receiver through only the channel being currently in idle state, which is different from the static access transmission method.

Referring to FIG. 2B, if the first secondary channel is occupied currently by another wireless sender, the wireless sender transmits data to the receiver through only the primary channel (that is, the 20 MHz channel), and if the first secondary channel is in the idle state, the wireless sender transmits data to the receiver through the primary channel and the first secondary channel (that is, the 40 MHz channel). Further, if the first secondary channel and the second secondary channel are in the idle state, the wireless sender transmits data to the receiver through the primary channel, the first secondary channel, the second secondary channel, and the third secondary channel (that is, the 80 MHz channel) being empty.

Like this, the methods for selecting and forming the transmission channels at the time when the wireless sender transmits data to the receiver have been explained with reference to FIGS. 1 to 2B.

Hereinafter, an explanation on the hidden channel problem to be solved through the present invention will be given with reference to FIGS. 3A and 3B.

Figure 3A:
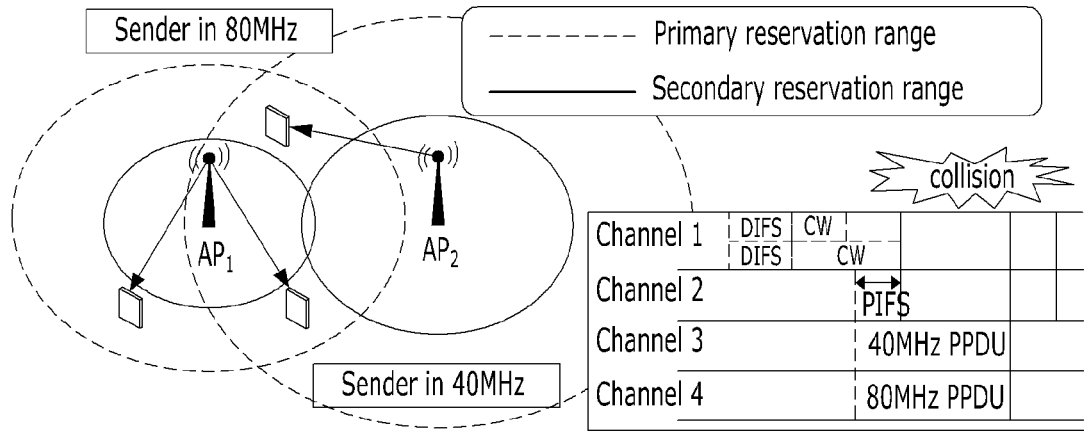
FIGS. 3A and 3B show network environments in a case where a hidden channel problem occurs.
Figure 3B:
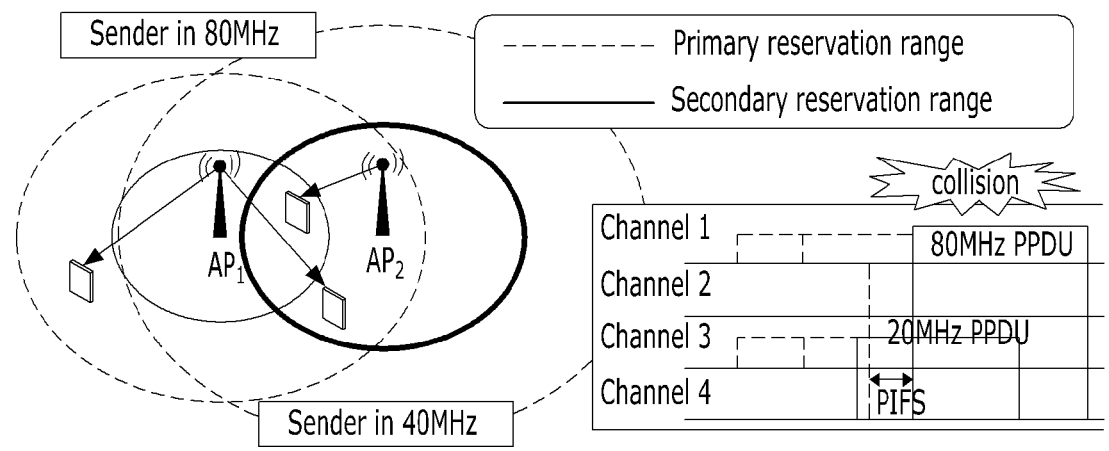

FIGS. 3A and 3B show two cases at the time when the hidden channel problem may arise.

First, FIG. 3A shows one case where under the existence of two wireless senders (a first wireless sender and a second wireless sender), the first wireless sender transmits data through the 80 MHz channel, and the second wireless sender transmits data through the 40 MHz channel, so that the communication range of the first wireless sender is smaller than that of the second wireless sender. The larger the use bandwidths of the transmission channels are, the smaller the communication ranges of the respective wireless senders are. As shown in FIG. 3A, the use bandwidth of the transmission channel of the first wireless sender is larger than that of the second wireless sender, and the communication range of the second wireless sender is larger than that of the first wireless sender.

In this case, the first wireless sender is within the communication range of the primary channel of the second wireless sender, and contrarily, the second wireless sender is out of the communication range of the primary channel of the first wireless sender. If it is assumed that such wireless networking environment exists, the second wireless sender cannot detect the transmission state of the first wireless sender, so that the first wireless sender and the second wireless sender simultaneously transmit data to one receiver, thereby inducing a data collision.

In detail, the first wireless sender can detect the transmission state of the second wireless sender, so that after the first wireless sender checks that 80 MHz transmission channels (first to fourth channels) are in idle state, it transmits data to the receiver. However, the second wireless sender cannot detect the transmission state of the first wireless sender, so that the second wireless sender has no choice but to recognize that the current transmission channels are in the idle state and simultaneously transmits data to the receiver to which the first wireless sender transmits data. Since the second wireless sender cannot recognize the transmission state of the first wireless sender, accordingly, the two wireless senders simultaneously share one channel to transmit data to the receiver, thereby causing a data collision. Like this, the data collision occurring by the difference between the communication ranges of the respective wireless senders is defined as the hidden channel problem.

On the other hand, FIG. 3B shows another network environment where the hidden channel problem may arise. As shown in FIG. 3B, under the existence of two wireless senders (a first wireless sender and a second wireless sender), the first wireless sender is out of the communication ranges of the secondary channels of the second wireless sender, so that the first wireless sender cannot detect the transmission states of the secondary channels of the second wireless sender.

In detail, the second wireless sender transmits data to the receiver through the third and fourth secondary channels, and since the first wireless sender cannot detect the transmission states of the secondary channels of the second wireless sender, it recognizes that the third and fourth channels as well as the first and second channels are in the idle state and transmits data through the 80 MHz channel, thereby causing a data collision.

Figure 4:
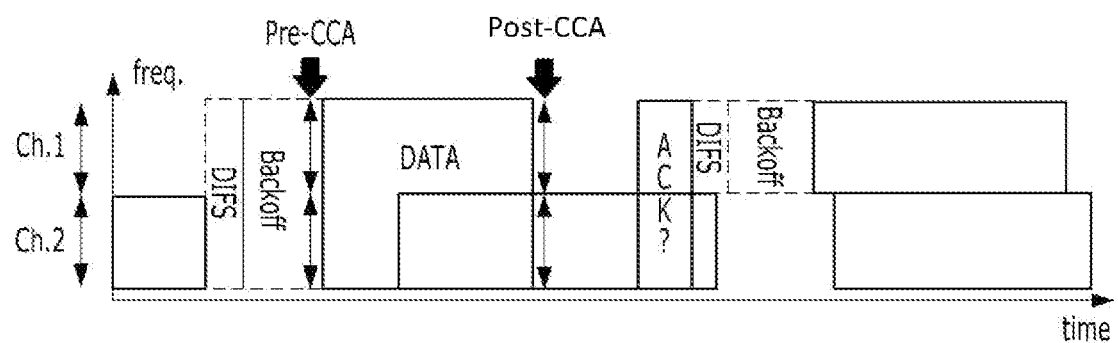
FIG. 4 shows a channel utilization state of a wireless sender when a data collision prevention method according to the present invention is utilized.

FIG. 4 shows a method for solving the hidden channel problem as mentioned above.

As shown in FIG. 4, the data collision prevention method according to the present invention includes the step of allowing a specific wireless sender at the time of transmitting data to a receiver to continuously detect transmission states of current channels, after transmitting a portion of the data to the receiver, to check whether the channels desired to be used are in idle state, and to transmit the data to the receiver through the channels if it is checked that the channels are in the idle channel.

At the time when the first wireless sender normally transmits data to the receiver, for example, if the second wireless sender transmits data to the receiver through channels overlapped with the first wireless sender, while not recognizing the transmission state of the first wireless sender, the first wireless sender recognizes the transmission states of the respective channels to check whether the channels are occupied by another wireless sender as well as the second wireless sender, thereby solving the hidden channel problem.

In the above-mentioned situation, in detail, the first wireless sender checks whether the transmission channels as desired to be used are in the idle state through a pre-checking step (Pre-CCA) and then transmits data to the receiver, and after a portion of data is transmitted, the first wireless sender checks whether a data collision occurs on the current channels through a post-checking step (Post-CCA). Referring in detail to FIG. 4, the first wireless sender checks whether the first and second channels are in the idle state through the pre-checking step (Pre-CCA) and then transmits data to the receiver, and after a portion of data is transmitted, the first wireless sender checks whether the first and second channels are still in the idle state through the post-checking step (Post-CCA) (at this time, checking whether the first and second channels are in the idle state is just one example, and it should be understood that the number of channels and the bandwidths of the respective channels may be varied).

On the other hand, at this time, checking whether the first and second channels are in the idle state through the first wireless sender will be carried out by means of two methods. According to a first method, the first wireless sender monitors the size of energy generated by the occupation of the channels to check whether the corresponding channels are in the idle state, and according to a second method, if there is a data packet transmitted and received through channels, the first wireless sender directly captures the data packet to check whether the corresponding channels are in the idle state.

In addition to the post-checking step (Post-CCA), on the other hand, the wireless sender receives an acknowledgement (ACK) packet from the receiver and more reliably recognizes whether the hidden channel problem occurs in the channels. In detail, as shown in FIG. 4, the wireless sender receives the acknowledgement (ACK) packet from the receiver after the post-checking step (Post-CCA). At this time, whether the corresponding channels are in the idle or busy state can be recognized in the post-checking step (Post-CCA), and whether the acknowledgement (ACK) packet is received or not can enable state information on the corresponding channels to be more accurately recognized.

Table 1 shows the channel states recognized by the wireless sender according to the post-checking step (Post-CCA) and the reception of the acknowledgement (ACK) packet.

TABLE 1

| Check | | |
|---|---|---|
| Post-checking step (Post-CCA) | Acknowledgement (ACK) | Channel state |
| Idle | Received | Normal |
| Idle | Not received | Fading error |
| Busy | Received | Occurrence of data collision but normal operation |
| Busy | Not received | Occurrence of data collision (Hidden channel problem) |

If it is checked that the transmission states of the channels are in the idle state through the post-checking step (Post-CCA) and the acknowledgement (ACK) packet is normally received from the receiver, the wireless sender recognizes that the corresponding channels are in normal state in currently transmitting data and starts to transmit the data through the corresponding channels (which is referred to as 'Case 1').

On the other hand, if it is checked that the transmission states of the channels are in the idle state through the post-checking step (Post-CCA) but the acknowledgement (ACK) packet is not normally received from the receiver, the wireless sender recognizes that the hidden channel problem does not occur in the corresponding channels but data transmission is not gently carried out (which means a fading error) by means of other reasons (which is referred to as 'Case 2').

Further, if it is checked that the transmission states of the channels are not in the idle state through the post-checking step (Post-CCA) but the acknowledgement (ACK) packet is normally received from the receiver, the wireless sender recognizes that the corresponding channels are occupied overlappedly with another wireless sender, that is, a data collision occurs in the corresponding channels but data transmission to the receiver is gently carried out (which is referred to as 'Case 3').

Lastly, if it is checked that the transmission states of the channels are not in the idle state through the post-checking step (Post-CCA) but the acknowledgement (ACK) packet is not normally received from the receiver, the wireless sender recognizes that the hidden channel problem occurs on the corresponding channels, that is, the corresponding channels are occupied overlappedly with another wireless sender, and simultaneously recognizes that data transmission to the receiver is not gently carried out through the occurrence of a data collision (which is referred to as 'Case 4').

The present invention is to solve the hidden channel problem occurring especially in the Case 4 among the above-mentioned Cases, and as shown in FIG. 4, if the wireless sender recognizes the hidden channel problem, it again transmits data only through the channel (that is, the first channel) on which the data transmission is possible, except the channel (that is, the second channel) having such hidden channel problem.

As described above, the data collision prevention method according to the present invention has been explained.

On the other hand, Table 2 shows pseudo codes performed by the wireless sender according to the present invention so as to solve the hidden channel problem if the wireless sender recognizes the hidden channel problem.

TABLE 2

Algorithm 1 Pseudo code for PoBA

Precondition: Afther finishing a transmission
Input: Post-CCA results & ACK
 1: if Entire bandwidth busy & no ACK then
 2:    State: Entire hidden channel collision
 3:    switch (Bandwidth)
 4:    case 20 MHz or 40 MHz:
 5:       Do explore, stay or extend randomly
 6:    case 80 MHz:
 7:       Do explore or stay randomly
 8: else if Partial bandwidth busy & no ACK then
 9:    State: Partial hidden channel collision
10:    switch (Bandwidth)
11:    case 40 MHz:
12:       Do reduce or explore randomly
13:    case 80 MHz:
14:       Do reduce
15: else
16:    State: No hidden channel collision
17:    switch (Bandwidth)
18:    case 20 MHz:
19:       Do perturb with a small probability
20:    case 40 MHz:
21:       Do perturb with a small probability
22:    case 80 MHz:
23:       Do notthing
24: end if The code examples of Table 2 are performed by the respective wireless senders in the environments as shown in FIGS. 2A to 3B. In detail, the code examples are based on situations where the first to fourth channels exist and the respective channels have a bandwidth of 20 MHz.

As appreciated from Table 2, after the wireless sender transmits data, that is, desirably, a portion of data, to the wireless receiver, the wireless sender monitors the result value of the post-checking step (Post-CCA) and the value of the acknowledgement (ACK), and if the values indicate the cases as indicated in first, eighth, and fifteenth rows, the operations in advance set according to the cases are performed by the wireless sender.

In detail, the first row assumes the case where it is checked that the transmission states of the channels are not in the idle state through the post-checking step (Post-CCA) but the acknowledgement (ACK) packet is not normally received from the receiver, and at this time, the wireless sender recognizes the current state as an 'entire hidden channel collision' state (which is indicated in a second row). The wireless sender performs operations as indicated in third to seventh rows to solve the hidden channel problem, that is, performs exploring, staying, reducing, and extending operations randomly according to whether the transmission channel utilized currently by the wireless sender is the 20, 40, or 80 MHz channel.

The exploring operation is an operation performed by changing the primary channel into another channel through the wireless sender, the staying operation is an operation performed to keep a current state, the reducing operation is an operation performed to reduce the transmission channel width (for example, to use only the first channel during the use of the first and second channels), and the extending operation is an operation performed to extend the transmission channel width (for example, to use the first and second channels during the use of the first channel).

On the other hand, the eighth row indicates the operation performed in the case where if it is checked that a portion of the transmission channels is not in the idle state through the post-checking step (Post-CCA) and the acknowledgement (ACK) packet is not normally received from the receiver, and at this time, the wireless sender recognizes the current state as a 'partial hidden channel collision' state. The wireless sender performs operations as indicated in tenth to fourteen rows, that is, performs exploring and reducing operations randomly according to whether the transmission channel utilized currently by the wireless sender is the 40 or 80 MHz channel (In the partial hidden channel collision state, at least 40 MHz transmission channel has to be utilized, and accordingly, 20 MHz transmission channel cannot exist).

On the other hand, a sixteenth row and rows under the sixteenth row indicate the operation performed in the case where if the hidden channel problem does not occur, and at this time, the wireless sender recognizes the current state as a 'no hidden channel collision' state. The wireless sender performs operations as indicated in eighteenth to twenty third rows according to whether the transmission channel utilized currently by the wireless sender is 20, 40 or 80 MHz. On the other hand, a perturbing operation is further performed in the current state, and the perturbing operation is an operation performed to extend the transmission channel width like the extending, but it is different from the extending operation in that it is performed only to more utilize the channels irrespective of the value of the post-checking step (Post-CCA).

On the other hand, Table 2 shows the operations performed by the wireless sender to solve the hidden channel problem, and at this time, it should be noted that the wireless sender performs the respective operations randomly. For example, the fourth and fifth rows in Table 2 indicate that the wireless sender performs any one of the exploring, staying and extending operations randomly at the time when the channel bandwidth is 20 or 40 MHz. At this time, performing the operations randomly means that the number of cases of the operations performable to solve the corresponding problem is in advance operated, probabilities are applied to the possible operations, and the operations are performed according to the applied probabilities. In case of the fourth and fifth rows, in detail, the hidden channel problem occurs during the channel bandwidth of 20 or 40 MHz is utilized, and to solve the hidden channel problem, three kinds of operations exist, so that the wireless sender performs the three kinds of operations, each of which having a probability of ⅓ applied thereto, unless there are specific circumstances. At this time, further, the probabilities applied to the respective operations are varied according to a designer's intention of the wireless sender or according to conditions in advance set. In case of utilizing the channel bandwidth of 20 or 40 MHz, that is, the wireless sender performs any one of the exploring, staying and extending operations with different probabilities from each other.

The operations of the wireless sender to solve the hidden channel problem at the time when the hidden channel problem occurs have been explained as mentioned above. Now, the above examples will be in detail described to explain how the wireless sender can be driven at the time when the hidden channel problem actually occurs.

Table 3 shows examples of the states where the hidden channel problem occurs.

TABLE 3

| Problem (1) | | (20, 2) ← (40, 1) SP, 25-43 m | | | |
|---|---|---|---|---|---|
| Explore | Solution | (20, 1) PP 43-54 m | (20, 2) SP 25-43 m | (20, 3) Ortho. X | (20, 4) Ortho. X |
| | Solved? | Yes | No | Yes | Yes |
| | Induced | X | same | X | X |
| Extend | Solution | (40, 1) PP X | (40, 2) PP X | (40, 3) Ortho. X | (40, 4) Ortho. X |
| | Solved? | Yes | Yes | Yes | Yes |
| | Induced | X | X | X | X |
| Problem (2) | | (20, 2), (20, 3), (20, 4) ← (80, 1) SP, 25-34 m | | | |
| Explore | Solution | (20, 1) PP 34-54 m | (20, 2) SP 25-34 m | (20, 3) SP 25-34 m | (20, 4) SP 25-34 m |
| | Solved? | Yes | No | No | No |
| | Induced | X | same | same | same |
| Extend | Solution | (40, 1) PP 34-43 m | (40, 2) PP 34-43 m | (40, 3) SP 20-34 m | (40, 4) SP 20-34 m |
| | Solved? | Yes | Yes | No | |
| | Induced | X | X | 40 ← 80 @ 25-34 m | |

To allow Table 3 to be understood, first, symbols and terms will be defined below.

Respective hidden channel problem situations are explained with Problem (1) and Problem (2), and at this time, each situation is defined with the symbols and terms as will be mentioned below.

"←" indicates a hidden channel relationship. In detail, brackets located at the right side of "←" indicate a state of the wireless sender as an interferer (hereinafter, referred to as 'interferer'), and brackets located at the left side of "←" indicate a state of the wireless sender as an interferee (hereinafter, referred to as 'interferee').

As mentioned above, the brackets located at the left and right sides of "←" indicate the states of the wireless senders. In detail, the bracket (40,1) indicates that the interferer uses the 40 MHz transmission channel and at this time, the primary channel is the first channel, and on the other hand, the bracket (20,2) indicates that the interferee uses the 20 MHz transmission channel and at this time, the primary channel is the second channel. Accordingly, the Problem (1) in Table 3 indicates the situation causing the hidden channel problem at the time when the interferer which occupies the 40 MHz transmission channel and uses the first channel as the primary channel transmits a signal to the interferee which occupies the 20 MHz transmission channel and uses the second channel as the primary channel (To the contrary, the Problem (1) indicates the situation where the interferee in the state of the bracket (20,2) occupies the sub-channel (or secondary channel) of the interferer in the state of the bracket (40,1)).

On the other hand, Table 3 indicates the relationship between the interferer and the interferee with combinations of symbols P and S. In detail, the symbol P indicates primary, and the symbol S secondary. Further, the first symbol indicates the channel occupied by the interferee, and the second symbol the channel occupied by the interferer. In case of 'SP' in the Problem (1), for example, the first symbol becomes 'S' because the interferee in the state of the bracket (20,2) occupies only the secondary channel (or sub-channel) of the interferer in the state of the bracket (40,1), and the second symbol becomes 'P' because the interferer in the state of the bracket (40,1) occupies the primary channel of the interferee in the state of the bracket (20,2).

On the other hand, Table 3 indicates distances, for example, 25-43 m, between the two wireless senders (interferer and interferee), and at this time, the distances indicate examples for distances in which the hidden channel problem can occur. In the description, the distances between the wireless senders are examples for the values obtained through tests, and therefore, it should be understood that they can be varied according to examples of the present invention.

Referring again to Table 3, if the hidden channel problem occurs, the interferer or interferee monitors the values of the post checking step and the acknowledgement as indicated in Table 2, thereby avoiding the data collision. So as to allow the present invention to be easily understood, in the description, the process of solving the hidden channel problem through the interferee will be explained with reference to Table 3.

Referring to Table 3, the interferee in the Problem (1) largely performs the exploring or extending operation to solve the hidden channel problem. In detail, the interferee sets (explores) the channels having bandwidths of 20 MHz as the primary channel except the second channel, and that is, the interferee changes the channel into channels (20,1), (20,3), or (20,4), thereby solving the hidden channel problem. In case of the interferee having the channel (20,1), it shares the primary channel with the interferer, so that the hidden channel problem can be solved, and in case of the interferee having the channel (20,3) or (20,4), the channel of the interferee is not overlapped with the channel of the interferer having the channel (40,1), so that the hidden channel problem can be solved. On the other hand, the channel (20,2) indicates the same environment as the conventional environment in which the hidden channel problem occurs, and therefore, it can be understood that the hidden channel problem cannot be solved in this state. Otherwise, the interferee extends the channel to solve the hidden channel problem, and that is, for example, the conventional channel (20,2) is extended to a channel (40,1), (40,2), (40,3) or (40,4). In case of the interferee having the channel (40,1), it shares the primary channel having the same bandwidth as the interferer with the interferer, so that the hidden channel problem can be solved, and in case of the interferee having the channel (40,2), the channel of the interferee is not overlapped with the primary channel of the interferer, so that the hidden channel problem can be solved. On the other hand, in case of the interferee having the channel (40,3) or (40,4), the channel of the interferee is not overlapped with the primary channel of the interferer, so that the hidden channel problem can be solved.

In summary, the interferee, that is, the wireless sender selects any one of the seven kinds of solutions as mentioned above if the hidden channel problem like the Problem (1) occurs, thereby solving the hidden channel problem. Further, at this time, the interferee applies the same probability as each other to the seven kinds of solutions or applies a weighted value to at least any one solution and thus selects the solutions randomly.

Referring again to Table 3, the Problem (2) indicates another hidden channel problem that may arise at the time when the interferee occupies the 20 MHz channel. Accordingly, if the interferer occupies the 80 MHz channel (corresponding to four 20 MHz channels) and uses the first channel as the primary channel, the hidden channel problem occurs in an environment where the interferee has channels (20,2), (20,3) or (20,4) (At this time, a distance between the interferee and the interferer is 25-34 m).

So as to solve the Problem (2), the interferee performs the exploring or extending, like the Problem (1). In detail, the interferee sets (explores) the transmission channel to the channel (20,1), and in this case, the interferee shares the primary channel with the interferer, so that the hidden channel problem can be solved. On the other hand, the change into the channels (20,2), (20,3) or (20,4) indicates the same environment as the conventional environment in which the hidden channel problem occurs, and therefore, the hidden channel problem cannot be solved. In case where the interferee performs the exploring, that is, the hidden channel problem can be solved only in one case of the four cases. So as to solve the hidden channel problem, otherwise, the interferee extends the transmission channel. For example, the interferee extends the channel to the channels (40,1) or (40,2), so that the hidden channel problem can be solved. In case of the channel (40,1), the interferee shares the primary channel with the interferer, and in case of the channel (40,2), the primary channel of the interferee is not overlapped with the primary channel of the interferer, so that the hidden channel problem can be solved. However, the extension to the channel (40,3) or (40,4) cannot solve the hidden channel problem. This is because another hidden channel problem may be induced through simulation results if the channel of the interferee is extended to the 40 MHz channel in the state where the interferer and the interferee are spaced apart from each other by a distance of 25-34 m. According to the present invention, that is, in case of the extending operation, the hidden channel problem can be solved through only two cases among the four cases. On the other hand, the present invention is based on facts acquired through the simulations under the conditions in advance set, and of course, the situation where the hidden channel problems occurs and the number of solutions for solving the hidden channel problem may be different from those as mentioned above.

Like the Problem (1), in summary, the interferee in the Problem (2), that is, the wireless sender randomly selects any one of the three kinds of solutions capable of solving the hidden channel problem.

Table 4 shows solutions for solving the Problem (1) as the hidden channel problem that may arise in a situation where the interferer has the channel (20,1) and the interferee has the channel (40,1) and for solving the Problem (2) as the hidden channel problem that may arise in a situation where the interferer has a channel (80,1) and the interferee has the channel (40,1) or (40,4).

TABLE 4

| Problem (1) | | (40, 1) ← (20, 1) PP, 43-54 m | | | |
|---|---|---|---|---|---|
| Reduce | Solution | (20, 1) PP X | (20, 2) Ortho. X | (20, 3) Ortho. X | (20, 4) Ortho. X |
|  | Solved? | Yes | Yes | Yes | Yes |
|  | Induced | X | X | X | X |
| Explore | Solution | (40, 1) PP 43-54 m | (40, 2) PS 25-43 m | (40, 3) Ortho. X | (40, 4) Ortho. X |
|  | Solved? | No | Yes | Yes | Yes |
|  | Induced | same | X | X | X |
| Extend | Solution | (80, 1) PP 34-54 m | (80, 2) PS 25-34 m | (80, 3) PS 25-34 m | (80, 4) PS 25-34 m |
|  | Solved? | No | Yes | Yes | Yes |

TABLE 4-continued

|  | Induced | 20 ← 80 @ 43-54 m | X | X | X |
|---|---|---|---|---|---|
| Problem (2) | | (40, 3), (40, 4) ← (80, 1) SP, 20-34 m | | | |
| Reduce | Solution | (20, 1) PP 34-54 m | (20, 2) SP 25-34 m | (20, 3) SP 25-34 m | (20, 4) SP 25-34 m |
|  | Solved? | Yes |  | Partially |  |
|  | Induced | X | 20 ← 80 @ 25-34 m | | |
| Explore | Solution | (40, 1) PP 34-43 m | (40, 2) PP 34-43M | (40, 3) SP 20-34 m | (40, 4) SP 20-34 m |
|  | Solved? | Yes | Yes | No | No |
|  | Induced | X | X | same | same |
| Extend | Solution | (80, 1) PP X | (80, 2) PP X | (80, 3) PP X | (80, 4) PP X |
|  | Solved? | Yes | Yes | Yes | Yes |
|  | Induced | X | X | X | X |

So as to solve the Problem (1), first, the interferee can solve the hidden channel problem through the reducing, exploring, or extending operation. Since the interferee occupies the 40 MHz channel, particularly, it can reduce the channel width, unlike Table 3. In detail, the interferee reduces the channel (40,1) to the 20 MHz channel, thereby solving the hidden channel problem, and at this time, the hidden channel problem can be solved in all cases, irrespective of what the primary channel' number is. On the other hand, the interferee sets (explores) the channel to another channel except the channel (40,1), that is, to another channel (40,2), (40,3), or (40,4), thereby solving the hidden channel problem. Otherwise, the interferee extends the conventional channel (40,1) to another channel (80,2), (80,3), or (80,4), thereby solving the hidden channel problem. However, the extension to the channel (80,1) causes another hidden channel problem, so that it cannot become a solution.

As a result, the solutions in the Problem (1) include the four cases solvable by the reducing operation, the three cases by the exploring operation, and the three cases by the extending operation, and the interferee, that is, the wireless sender randomly selects the solutions, thereby solving the hidden channel problem.

So as to solve the Problem (2), next, the interferee can solve the hidden channel problem through the reducing, exploring, or extending operation, like the Problem (1). In detail, the interferee reduces the channel (40,3) or (40,4) to the 20 MHz channel, thereby solving the hidden channel problem, and at this time, it should be noted that if the primary channel is set as the first channel, the hidden channel problem can be completely solved, but if the primary channel is set as the second, third or fourth channel, the hidden channel problem may partially occur. As appreciated from Table 4, in the environment where a distance between the interferee and the interferer is 25-34 m, another hidden channel problem may occur. On the other hand, the interferee sets (explores) the channel (40,3) or (40,4) to the channel (40,1) or (40,2), thereby solving the hidden channel problem. Otherwise, the interferee extends the conventional channel to the 80 MHz channel, thereby solving the hidden channel problem.

As a result, the solutions in the Problem (2) include one case solvable by the reducing operation, the three cases solvable partially by the reducing operation, the two cases by the exploring operation, and the four cases by the extending operation, and the interferee randomly selects any one of the solutions. At this time, it should be understood that a probability value selected in each solution can be adjusted according to the designer's intention.

Table 5 shows solutions for solving the Problem (1) as the hidden channel problem that may arise in a situation where the interferer has the channel (20,1) and the interferee has the channel (80,1) and for solving the Problem (2) as the hidden channel problem that may arise in a situation where the interferer has a channel (40,1) and the interferee has the channel (80,1) or (80,2).

TABLE 5

| Problem (1) | | (80, 1) ← (20, 1) PP, 34-54 m | | | |
|---|---|---|---|---|---|
| Reduce | Solution | (40, 1) PP 43-54 m | (40, 2) PS 25-43 m | (40, 3) Ortho. X | (40, 4) Ortho. X |
| | Solved? | Partially | | Yes | Yes |
| | Induced | 40 ← 20 @ 43-54 m | 20 ← 40 @ 34-43 m | X | X |
| Explore | Solution | (80, 1) PP 34-54 m | (80, 2) PS 25-34 m | (80, 3) PS 25-34 m | (80, 4) PS 25-34 m |
| | Solved? | No | Yes | Yes | Yes |
| | Induced | same | X | X | X |

| Problem (2) | | (80, 1), (80, 2) ← (40, 1) PP, 34-43 m | | | |
|---|---|---|---|---|---|
| Reduce | Solution | (40, 1) PP X | (40, 2) PP X | (40, 3) Ortho. X | (40, 4) Ortho. X |
| | Solved? | Yes | Yes | Yes | Yes |
| | Induced | X | X | X | X |
| Explore | Solution | (80, 1) PP 34-43 m | (80, 2) pp 34-43 m | (80, 3) PS 20-34 m | (80, 4) PS 20-34 m |
| | Solved? | No | No | Yes | Yes |
| | Induced | same | same | X | X |

So as to solve the Problem (1), the interferee can solve the hidden channel problem through the reducing or exploring operation. Since the interferee occupies the 80 MHz channel having a maximum bandwidth currently occupiable, at this time, it is impossible for the interferee to perform the exploring operation. In detail, the interferee reduces the channel to the 40 MHz channel, thereby solving the hidden channel problem, and at this time, if the interferee reduces the channel to the channel (40,1) or (40,2), another hidden channel problem may occur, so that the reduction to the channel (40,1) or (40,2) can be selected as partial solutions. If the interferee reduces the channel to the channel (40,3) or (40,4), however, the reduction to the channel (40,3) or (40,4) can be selected as complete solutions. Otherwise, the interferee sets (explores) one of the second to fourth channels as the primary channel, while maintaining the 80 MHz channel, thereby solving the hidden channel problem.

If the hidden channel problem like the Problem (1) occurs, as a result, the interferee, that is, the wireless sender have solutions including the two cases solvable by the reducing operation, the two cases solvable partially by the reducing operation, and the three cases by the exploring operation, and the interferee randomly selects any one of the solutions.

So as to solve the Problem (2), next, the interferee can solve the hidden channel problem through the reducing or exploring operation, like the Problem (1). In detail, the interferee reduces the channel to the 40 MHz channel, thereby solving the hidden channel problem, and at this time, the hidden channel problem can be completely solved in all cases. Otherwise, the interferee sets (explores) the conventional channel (80,1) or (80,2) to the channel (80,3) or (80,4), thereby solving the hidden channel problem.

As a result, the solutions in the Problem (2) include the four cases solvable by the reducing operation and the two cases by the exploring operation, and the interferee randomly selects any one of the solutions.

As mentioned above, the processes of solving the hidden channel problems through the wireless sender according to the present invention have been explained with reference to Tables 2 to 5.

Figure 5:
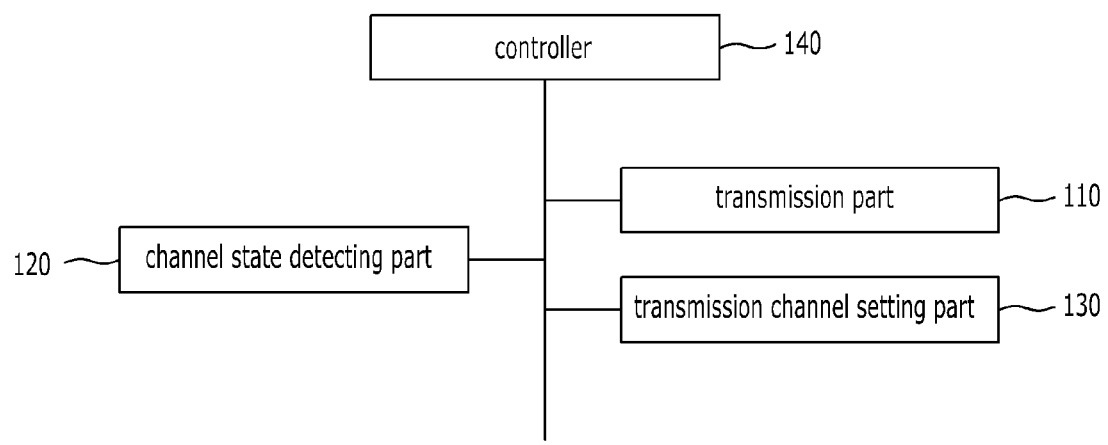
FIG. 5 shows a block diagram of a detailed configuration of a wireless sender according to the present invention.

FIG. 5 shows a block diagram of a detailed configuration of the wireless sender according to the present invention capable of performing the data collision protection method as mentioned above.

The wireless sender includes a transmission part 110, a channel state detecting part 120, a transmission channel setting part 130, and a controller 140.

The transmission part 110 serves to transmit the data packet to the receiver, and in this case, the transmission part 110 transmits the data packet to the receiver through a channel formed between the corresponding wireless sender and the receiver.

The channel state detecting part 120 serves to detect the current transmission state of the channel to the receiver, and after the data is transmitted through the transmission part 110, the channel state detecting part 120 performs the step of checking whether the transmission channel is in the idle state, that is, the post checking step (Post-CCA).

On the other hand, it should be understood that the channel state detecting part 120 can perform the pre-checking step (Pre-CCA), as well.

Further, the channel state detecting part 120 performs the step of checking whether the acknowledgement (ACK) packet is received from the receiver after the post checking step Post-CCA. In detail, the acknowledgement (ACK) packet is received from the transmission part 110, but the channel state detecting part 120 checks whether the acknowledgement (ACK) packet is received through the transmission part 110 to determine the channel state. At this time, the channel state detecting part 120 recognizes the above-mentioned four Cases and lastly transmits the corresponding information to the controller 140, so that the controller 140 determines whether the data transmission is kept or stopped.

The transmission channel setting part 130 recognizes whether the hidden channel problem occurs through the value of the post checking step and the reception of the acknowledgement (ACK) packet acquired by the channel state detecting part 120, and if it is recognized that the hidden channel problem occurs, the transmission channel setting part 130 changes the transmission channel of the corresponding wireless sender. As described in Tables 2 to 5, the transmission channel setting part 130 performs the reducing, extending, or exploring operation to solve the hidden channel problem that will be occurrable between the wireless senders or that has already occurred therebetween. On the other hand, the transmission channel setting part 130 can select the solutions randomly with reference to a memory (which is disposed in the corresponding wireless sender) in which the solutions by situation are stored. Furthermore, the transmission channel setting part 130 repeatedly performs the selection and implementation of solutions if necessary, thereby trying to solve the hidden channel problem.

Lastly, the controller 140 totally controls the transmission part 110, the channel state detecting part 120, and the transmission channel setting part 130, and it includes at least one operation means and at least one storage means. At this time, the operation means is a general central processing unit (CPU), and otherwise, it may be a complex programmable logic device (CPLD), field programmable gate array (FPGA), application specific integrated circuit (ASIC), or microcontroller chip, which is designed for a specific purpose. Further, a volatile memory device, non-volatile memory device, or non-volatile electromagnetic storage device may be utilized as the storage means.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

EXPLANATIONS ON REFERENCE NUMERALS IN THE DRAWING

100, 101, 103: wireless sender
110: transmission part
120: channel state detecting part
130: transmission channel setting part
140: controller
300: receiver

The invention claimed is:

1. A data collision prevention method in a wireless environment wherein under the existence of a first wireless sender and a second wireless sender close to each other, the first wireless sender detects a transmission channel state of the second wireless sender, whereas the second wireless sender cannot detect a transmission channel state of the first wireless sender, comprising the steps of:
   (a) transmitting data to a receiver from the first wireless sender;
   (b) checking (Post-CCA) whether a transmission channel to the receiver is in idle state through the first wireless sender after transmitting the data to the receiver;
   (b-1) checking whether acknowledgement (ACK) is received through the first wireless sender after the step (b); and
   (c) determining whether the data is transmitted to the receiver through the first wireless sender according to the checking result in the step (b),
   wherein if it is checked that the transmission channel is not in the idle state in the step (b) and if it is checked that the acknowledgement (ACK) is not received in the step (b-1), the first wireless sender in the step (c) recognizes that a hidden channel problem occurs on the channel to the receiver.

2. The data collision prevention method according to claim 1, wherein in the step (b), an energy level of the transmission channel is detected to check whether the transmission channel is in the idle state.

3. The data collision prevention method according to claim 1, wherein in the step (b), the first wireless sender captures a data packet transmitted and received through the transmission channel to check whether the transmission channel is in the idle state.

4. The data collision prevention method according to claim 1, wherein if the first wireless sender in the step (c) recognizes that a hidden channel problem occurs on the channel to the receiver, the first wireless sender stops the data transmission.

5. The data collision prevention method according to claim 1, wherein if the first wireless sender in the step (c) recognizes that a hidden channel problem occurs on the channel to the receiver, the first wireless sender performs a reducing, extending, or exploring operation to change the transmission channel to the receiver.

6. The data collision prevention method according to claim 1, further, before the step (a), comprising the step of checking (Pre-CCA) whether the transmission channel to the receiver is in the idle state through the first wireless sender.

7. A wireless sender for preventing a data collision in a wireless environment wherein under the existence of the corresponding wireless sender close to the other wireless sender, the corresponding wireless sender can detect a transmission channel state of the other wireless sender, and the other wireless sender cannot detect a transmission channel state of the corresponding wireless sender, the wireless sender comprising:
   a transmission part for forming a transmission channel to a receiver to transmit data to the receiver; and
   a controller configured to:
   detect the transmission channel state to the receiver;
   check (Post-CCA) whether transmission channel is in idle state after the data is transmitted to the receiver through the transmission part; and
   check whether acknowledgement (ACK) is received after checking whether the transmission channel is in the idle state,
   wherein if it is checked that the transmission channel is not in the idle state and if it is checked that the acknowledgement (ACK) is not received, the controller is configured to recognizes that a hidden channel problem occurs on the channel to the receiver.

8. The wireless sender according to claim 7, wherein if the controller recognizes that a hidden channel problem occurs on the channel to the receiver, stops the controller is configured to stop the data transmission.

9. The wireless sender according to claim 7, wherein the controller is further configured to change the transmission channel, wherein if the controller recognizes that a hidden channel problem occurs on the channel to the receiver, the controller is configured to allow the transmission channel setting part to perform a reducing, extending, or exploring operation to change the transmission channel to the receiver.

* * * * *